(12) United States Patent
Richardson et al.

(10) Patent No.: US 7,729,939 B2
(45) Date of Patent: Jun. 1, 2010

(54) METHOD AND APPARATUS FOR PLANNING AND MONITORING MULTIPLE TASKS BASED ON USER DEFINED CRITERIA AND PREDICTIVE ABILITY

(75) Inventors: Sandra Richardson, Washington, DC (US); Douglas Clark, Washington, DC (US); Matthew Bennett, Colorado Springs, CO (US); James Finwick, Colorado Springs, CO (US)

(73) Assignee: Metier, Ltd., Arlington, VA (US)

( * ) Notice: Subject to any disclaimer, the term of this patent is extended or adjusted under 35 U.S.C. 154(b) by 0 days.

(21) Appl. No.: 11/797,086

(22) Filed: Apr. 30, 2007

(65) Prior Publication Data

US 2007/0260505 A1 Nov. 8, 2007

Related U.S. Application Data

(63) Continuation of application No. 09/334,256, filed on Jun. 16, 1999, now Pat. No. 7,212,986.

(51) Int. Cl.
*G06Q 10/00* (2006.01)
(52) U.S. Cl. .......................................... 705/9
(58) Field of Classification Search .................. 705/8, 705/9
See application file for complete search history.

(56) References Cited

U.S. PATENT DOCUMENTS

| | | | |
|---|---|---|---|
| 4,942,527 A | 7/1990 | Schumacher | |
| 5,016,170 A | 5/1991 | Pollalis et al. | |
| 5,111,391 A | 5/1992 | Fields et al. | |
| 5,255,181 A | 10/1993 | Chapman et al. | |
| 5,321,610 A | 6/1994 | Breslin | |
| 5,406,476 A * | 4/1995 | Deziel et al. | 705/8 |
| 5,467,268 A | 11/1995 | Sisley et al. | |
| 5,530,861 A | 6/1996 | Diamant et al. | |
| 5,671,360 A | 9/1997 | Hambrick et al. | |
| 5,671,361 A | 9/1997 | Brown et al. | |
| 5,692,125 A | 11/1997 | Schloss et al. | |

(Continued)

FOREIGN PATENT DOCUMENTS

JP 06 124285 6/1994

(Continued)

OTHER PUBLICATIONS

AbouRizk, et al.; "Construction Simulation and Distribution Fitting in a Data Deficient Environment", (C) 1993 IEEE, pp. 493-499.*

(Continued)

*Primary Examiner*—Jonathan G Sterrett
(74) *Attorney, Agent, or Firm*—Dickstein Shapiro LLP

(57) ABSTRACT

Individual employees are permitted to be individuals and plan their work as individuals. Individuals are only asked to plan their work within a limited tasking horizon. Employees track their progress using verbs that are designed to capture the reasons behind positive and negative predictive ability. Verbs are analyzed and expected predictive error, also know as risk, is calculated. Once verbs are captured they can be analyzed for ways to improve predictive ability. In addition, the risk can be factored into the initial planning stage so as to include an expected predictive error in the initial planning.

12 Claims, 10 Drawing Sheets

U.S. PATENT DOCUMENTS

| | | | |
|---|---|---|---|
| 5,760,770 | A | 6/1998 | Bliss et al. |
| 5,765,139 | A | 6/1998 | Bondy |
| 5,765,140 | A | 6/1998 | Knudson et al. |
| 5,767,848 | A | 6/1998 | Matsuzaki et al. |
| 5,798,950 | A | 8/1998 | Fitzgerald |
| 5,818,715 | A | 10/1998 | Marshall et al. |
| 5,836,011 | A | 11/1998 | Hambrick et al. |
| 5,848,394 | A | 12/1998 | D'Arrigo et al. |
| 5,855,006 | A | 12/1998 | Huemoeller et al. |
| 5,893,074 | A * | 4/1999 | Hughes et al. .......... 705/8 |
| 5,923,552 | A * | 7/1999 | Brown et al. .......... 700/100 |
| 6,014,633 | A | 1/2000 | DeBusk et al. |
| 6,023,572 | A | 2/2000 | Lautzenheiser et al. |
| 6,047,260 | A | 4/2000 | Levinson |
| 6,101,481 | A | 8/2000 | Miller |
| 6,192,346 | B1 | 2/2001 | Green |
| 6,584,447 | B1 | 6/2003 | Fox et al. |

FOREIGN PATENT DOCUMENTS

| | | |
|---|---|---|
| JP | 10 240827 | 11/1998 |
| WO | WO 99/04370 | 1/1999 |
| WO | WO 00/67118 | 11/2000 |

OTHER PUBLICATIONS

Cox, Earl, Terlaga, Ray; "A Clear Approach to Fuzzy Logic", Chief Information Officer Journal. New York: Fall 1992. vol. 5, Iss. 2; p. 32 (6 pages).*

Barki, Henri; Rivard, Suzanne; Talbot, Jean; "Toward an assessment of software development risk", Fall 1993, Journal of Management Information Systems, v10n2, pp. 203-225. Dialog 00813256 94-62648.*

Cox, Earl; "Applications of Fuzzy System Models", Oct 1992, AI Expert, v7, n10, p34(6), Dialog 01532834 12551188.*

Kangari, Boozbeh; Riggs, Leland S; "Construction Risk Assessment by Linguistics", © 1989 IEEE, IEEE, Transactions on Engineering Management, vol. 36, No. 2, May 1989, pp. 126-131.*

Guiffrida; Alfred L; Nagi, Rakesh; "Fuzzy Set Theory Applications in Production Management Research: a Literature Survey", 1998, Journal of Intelligent Manufacturing, 9, pp. 39-56.*

Attaran, Mohsen; "The coming age of fuzzy logic in manufacturing & services", Mar.-Apr. 1996, Journal of Systems Management, v47, n2, p4(9), Dialog 08695294 18304943.*

Gowing, et al; "A rational method for assessing irrigation performance at farm level with the aid of fuzzy set theory", © 1996 Kluwer Academic Publishers, Irrigation and Drainage Systems 10: 310-330.*

Duncan, Willam R (ed); "A Guide to the Project Management Body of Knowledge", © 1996 PMI, p. vi-viii, 1, 31, 60,64-68, 118, 119, 167.*

Mon, et al; "Application of fuzzy distributions on project management", 1995, Fuzzy Sets and Systems 73, 227-234.*

Fetz, et al; "Fuzzy models in geotechnical engineering and construction management", Mar. 1999, Computer Aided Civil and Infrastructure Engineering, 14(2), pp. 93-106.*

Using metrics in management decision making G Stark, RC Durst, CW Vowell—Computer, 1994—ieeexplore.ieee.org.*

Special Feature: Impact of Schedule Estimation on Software Project Behavior TK Abdel-Hamid, SE Madnick— IEEE Software, 1986—ieeexplore.ieee.org.*

A software project dynamics model for process cost, schedule and risk assessment RJ Madachy—1994—sunset.usc.edu.*

AbouRizk et al. "Construction Simulation and Distribution Fitting in a Data Deficient Enviroment", Uncertainty Modeling and Analysis, 1993, Proceedings, Second International Symposium on College Park, MD, USA, Apr. 25-28, 1993, Los Alamitos, Ca, USA, IEEE Computers Soc., Apr. 25, 1993, pp. 493-499.

William R. Duncan, "A Guide to the Project Management Body of Knowledge," Project Management Institute, 1996; p. 8-10, p. 30-32, p. 42, p. 59-62, p. 70, p. 107-108; p. 157-171.

* cited by examiner

METHOD AND APPARATUS FOR PLANNING AND MONITORING MULTIPLE TASKS BASED ON USER DEFINED CRITERIA AND PREDICTIVE ABILITY

This application is a continuation of U.S. patent application Ser. No. 09/334,256 filed Jun. 16, 1999, now U.S. Pat. No. 7,212,986, the contents of which is hereby incorporated in its entirety.

I. FIELD OF THE INVENTION

The present invention relates to an improved method and apparatus for planning and monitoring the assignment and completion of a project that is comprised of an aggregate of tasks.

II. TECHNICAL BACKGROUND

A project typically requires a large amount of time and involves many individuals from different disciplines and professions. Project oriented tasks typically have more uncertainty and fluidity than other types of work, such as repetitive tasks performed with functionally oriented work. As a result, specialized methodology and tools for managing projects have been needed.

Large companies typically utilize programmable computers and associated databases to manage available personnel and track expended labor hours. Various internal and external funding accounts may exist to which personnel may charge their labor time. Because large companies are unable to track and predict the work habits of individual employees, they track macro indicators such as total cost and total time. Planning on a macro level is never accurate and never identifies the reasons for the inaccuracies so as to permit the planning model to be refined.

Common examples of macro models include tracking work performed in completing a capital project so that it can be depreciated for tax purposes. Accordingly, a specific Capital Project Appropriation Request (CPAR) is created to which personnel may charge expended time in performing work thereunder.

One conventional system is known as the Automated Issue Management System (AIMS) and is used in conjunction with another conventional system called Time Entry System (TES) which are used for capitalizing internal and external labor. The systems are contained in conventional programmable computers for more accurately managing the large number of personnel involved and the substantial number of individual tasks associated with various capital projects. A project manager typically initiates a project by opening a specific work request in the AIMS system. The system automatically provides a respective AIMS number, which typically has a correlation to a single CPAR number. The manager assigns personnel to complete tasks based on an AIMS number. The TES system allows personnel to record through a personal computer expended time per AIMS number as the work is completed. The TES system allows the manager to examine cumulative time expended for specific AIMS numbers, with the manager manually correlating the AIMS number to a specific CPAR.

Although the AIMS and TES systems facilitate managing projects in a large company, project planning and managing is nevertheless relatively complex in most circumstances. To further facilitate project management in large companies, commercially available software has been developed. One available management tool or product is conventionally known as Microsoft Project from Microsoft Corp., and another product is ABT Project Workbench from the Applied Business Technology Corporation. These software tools allow companies to define project plans in accordance with tasks and time schedules for available personnel resources, and arc typically operated in stand-alone fashion or in conjunction with other commercially table software products for facilitating the overall management of projects. However, these commercially available products are designed for specific applications and are therefore limited in capability, as well as having no built in capability for managing project funding such as the CPAR example introduced above.

An example of previously disclosed systems include U.S. Pat. No. 5,111,391, which describes a staff scheduling data processing system and method schedules staff and management personnel at locations remote from a central location by applying central location policy to unique remote location data to insure the optimum staff schedule for each remote site.

U.S. Pat. No. 5,818,715 describes a method and system for modifying a project model in response to an update.

U.S. Pat. No. 5,767,848 describes a development support system for supporting new product development activities, which includes a target storage for storage target values of schedules of product development, and the cost and the performance of the product; an estimating unit for estimating schedules of product development and the cost and the performance of the product on the basis of the models stored in the model storage. The '848 patent includes a unit for monitoring electronic mail necessary for carrying out tasks essential to the development of the product, extracting information relating to the progress of tasks essential to carrying out the development of the product, and providing the members of the development project team with information about the progress of the tasks.

U.S. Pat. No. 5,765,140 describes a dynamic project management system includes a server network and a master database.

U.S. Pat. No. 5,692,125 describes a scheduling system, events and/or groups of events are checked at a scheduling time to insure that certain fixed conditions associated with the event(s) are satisfied.

U.S. Pat. No. 4,942,527 describes a computing apparatus for an improved information system that manages.

All of these proposed systems, however, fail to adequately include factors necessary for adequate task planning and are incapable of efficiently and accurately planning and managing project tasks. All of these systems are based on the premise that planning is dependent upon macro attributes, such as time and cost. In tying planning to these macro attributes that are used regardless of the employee base and regardless of the planning model, these systems are inherently limited and fail to account for the way people actually work.

III. SUMMARY OF THE INVENTION

The present Invention is designed to evaluate the entire workflow process for human factors on both macro and micro levels. The present invention breaks down projects into micro events and tracks the group's predictive ability (the ability to plan and carry out tasks as planned).

The present system recognizes that certain factors that effect planning and management are incapable of being quantified on a macro level and must be incorporated into the planning process on a micro level. The present system recognizes that the best knowledge of how productive or efficient an individual employee will be over a given time period is likely to rest with that individual employee.

Not every individual is able to predict or schedule work with the same degree of accuracy. The accuracy of an entire group to plan and execute on that plan is only as good as the weakest link. The present invention recognizes this and provides a system and method that uses tasks and user defined goals to measure predictive ability. As individual predictive ability is optimized, the group's predictive ability is also optimized. This permits projects to be planned and executed with the greatest degree of planning accuracy.

Thus, the present-system has several stages. Individual employees are permitted to be individuals and plan their work as individuals. Individuals are only asked to plan their work within a limited tasking horizon. Employees track their progress using verbs that are designed to capture the reasons behind positive and negative predictive ability. Verbs are analyzed and expected predictive error, also know as risk, is calculated. Once verbs are captured they can be analyzed for ways to improve predictive ability. In addition, the risk can be factored into the initial planning stage so as to include an expected predictive error in the initial planning. Tasks may also be analyzed and linked to other tasks to account for inherent related task risk.

In general, the present invention breaks projects down into individual assignable tasks. Tasks are assigned for a predetermined time, up to the tasking horizon, by an employer or project manager. The tasking horizon is designed to be a realistic planning window that corresponds to the length of time most employees can plan their work. In one example, the tasking horizon is a two-week period. It may also be a week, days or months. Depending on the tasks, workers and work environment, the tasking horizon may vary.

Next, verbs are selected that capture the types of dialogues that an employee faced with the task may use to describe their progress. Verbs are meant to capture generalized categories of dialogue that workers would routinely engage in if they were each interviewed on a routine basis throughout a project. For example, verbs may be selected to provide a series of potential answers to a standard question, such as "why do you think you performed this task faster or slower than estimated?" In one embodiment, verbs can be broken down into employee dependent verbs (health, mental well being, etc.), task related verbs (new computers not working, etc.), environmental verbs (snow, etc.) or in any number of ways. Verbs are used to categorize and classify employee responses to assist in maximizing predictive ability.

Each employee is provided with access to a task assignment station or a PC. The task assignment station provides the employee with knowledge about their tasks that need to be scheduled, started or completed during the next tasking horizon. The database does not set a time period in which each task is to be completed but allows the employee to instruct the system when, and in what order, the employee thinks that a task will be started and finished. As the system works by maximizing the employee's predictive ability, it is preferable that the employee has some control over the scheduling of tasks. As employees perform tasks they access the database to record when a task is started and when it is completed.

In addition, the task assignment station is provided with the list of verbs to select from that best describe the reason the task was completed before or after the employee predicted. An employee's ability to accurately predict when a task is completed, or not, is referred to as churn. Thus, churn is a measure of the employee's predictive ability. An employee that starts work when expected and finishes when expected will have a low churn.

One goal of the present invention is to have each employee accurately predict when tasks will be completed. This information is invaluable in accurately predicting and planning projects. When individual predictive ability is optimized, the group benefits and is able to accurately predict and plan projects.

Because the present invention is based on employee input, it has the advantage of gathering unique data on the way employees work. Because the system has access to employee verbs, it can also be used to identify management issues, such as the need for training that will assist the employer in minimizing future churn. The present system also assists in identifying natural work patterns of employees and accounts for the way employees actually work when planning projects.

Because the present invention is a dynamic system, rather than a static (cost and time) system, the traditional vocabulary that has been used in management systems is insufficient. Thus, in the present invention the following terms have definitions other than their tradition definition. They are as follows:

| Term | Definition |
|---|---|
| Churn | The movement of tasks in relation to the tasking horizon |
| Horizon | The farthest point in time in the future where a manager believes a task will be completed as planned (usually referred to as the tasking horizon.) |
| Language | Structured verbs, objects, project phase definitions, and tasking horizons used to capture the Tasking-Closure Dialogue. |
| Management | The practice of controlling an organization through tools and process mirroring the way humans perform tasks. |
| Navigate | Using structured task language and tasking horizons to control the course of a project. |
| Project | An undertaking comprised of phases and goals and performed by a team or teams. |
| Task | An item or work decomposed to the lowest level possible. |

IV. BRIEF DESCRIPTION OF THE DRAWINGS

The foregoing and other advantages and features of the invention will become more apparent from the detailed description of the preferred embodiments of the invention given below with reference to the accompanying drawings in which.

V. DETAILED DESCRIPTION OF THE DRAWINGS AND OF THE PREFERRED EMBODIMENT

The present system is designed to be dynamic and thus the hardware needed to implement it from embodiment to embodiment varies considerably.

Figure 1:
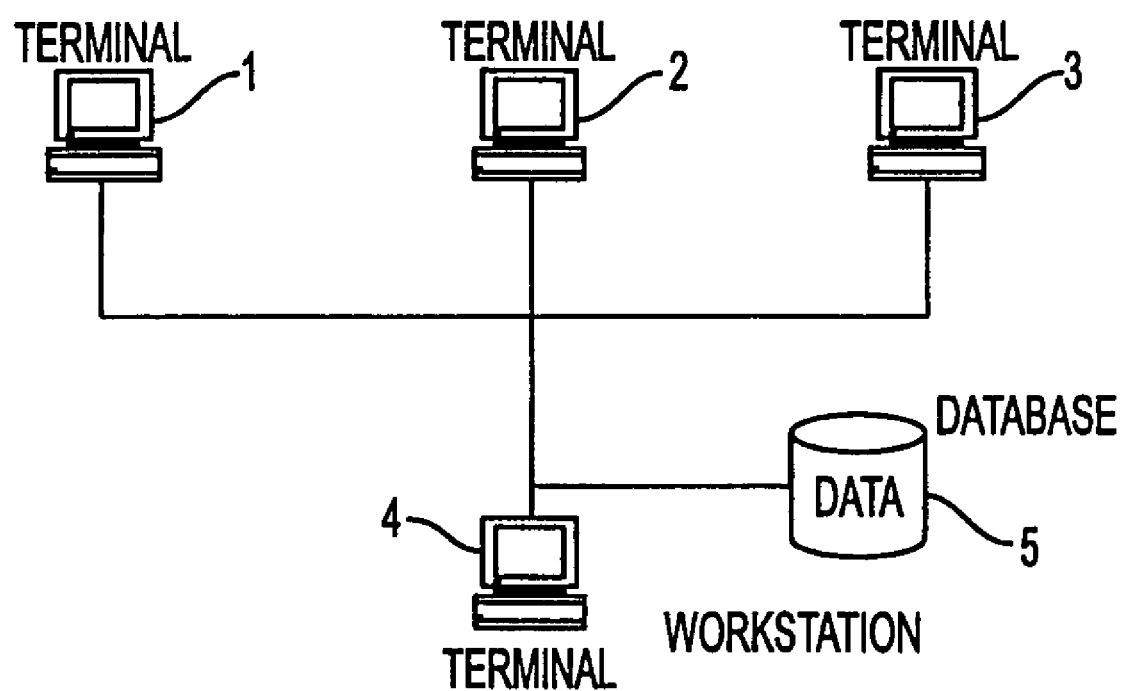
FIG. 1 is a diagram of an on-site implementation of the current system.
Figure 2:
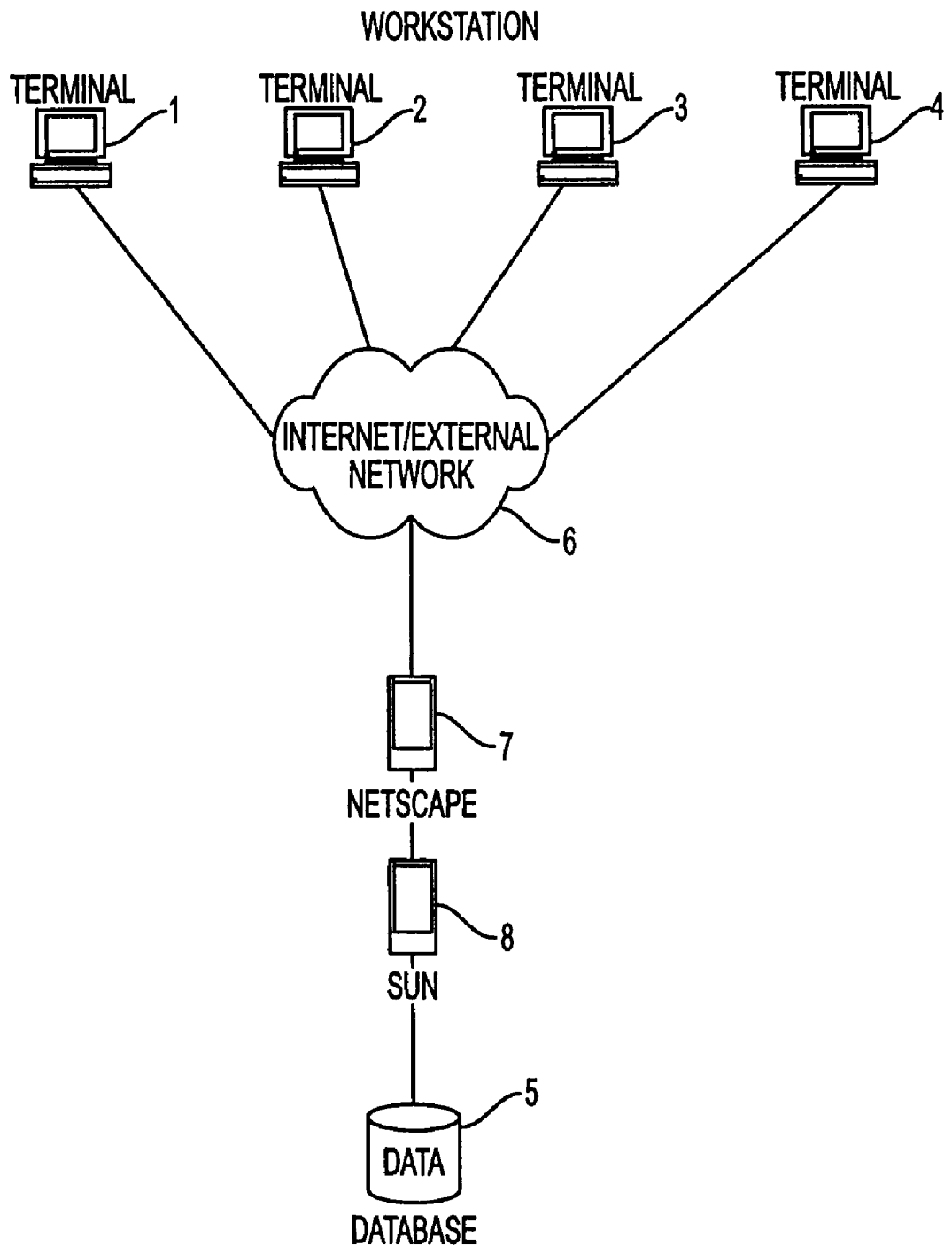
FIG. 2 is a diagram of an off site implementation of the current system.

The present invention can be run on an internal network as shown in FIG. 1 or over an external network (including the Internet) as shown in FIG. 2. Employees are connected to a network database 5 through the use of a PC. A manager is also connected to the network database 5 through a PC. Those of ordinary skill in the art will understand that a PC with a Pentium processor, 16 megs of RAM, a 5 meg hard-drive, an operating system (such as Windows '95 or higher) and a 56k modem or network connection are adequate to implement the present invention. In its most basic embodiment the entire system can be provided on a single PC with a Pentium processor, 64 megs of RAM, a 5 GB hard-drive, an operating system (such as Windows NT or similar operating system) that multiple user's have access to. Likewise, in a hardwired embodiment, similar components may be provided in a hardwired form.

Another implementation involves web server software running on a server that is used to produce an external network configuration. As shown in FIG. 2, an external network, such as the Internet 6, is provided. A server 7, such as a Netscape ES server is provided that is operationally connected to a workstation 8, such as a Sun Microsystems Workstation. The database 5 may be provided externally or internally to one or more of the PCs or workstations.

Figure 3:
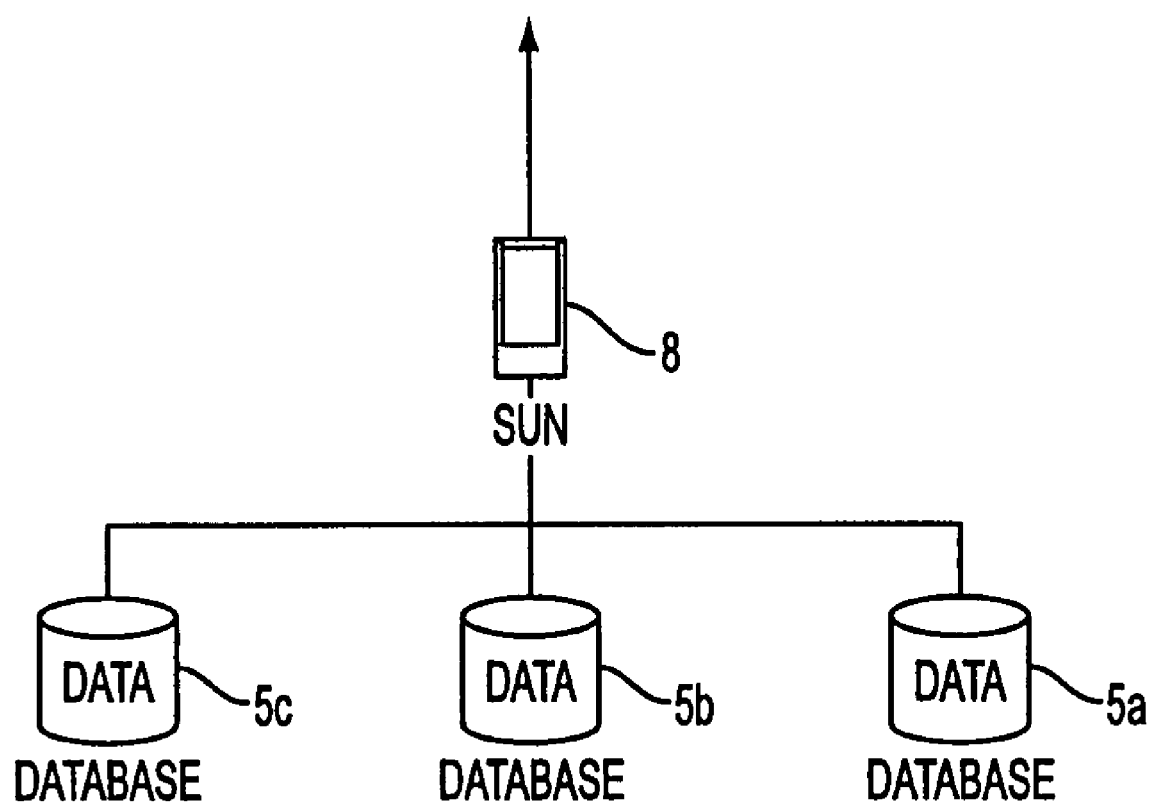
FIG. 3 is a schematic of an alternative database configuration.

The types of databases used may vary considerably. As shown in FIG. 3, the database 5 may have multiple sub-databases, which may be partitioned portions of database 5 or may be additional databases. The sub-databases may include a section to hold data associated with the present system 5a, employee human resource data 5b and/or time and billing data 5c. The multiple databases may be located at different locations and data may be shared on a periodic basis or though other conventional means.

As the present invention is designed to operate dynamically, those of ordinary skill in the art will recognize that it may be installed over a variety of computing systems. For example, in addition to the single network system shown in FIG. 1, it is expressly contemplated that multiple networks and/or sub-networks may be incorporated and that the present invention may be implemented in whole or in part over all or over selected portions of the network. For example, the management functions, such as assigning risk, may be implemented in an upper management system, the task assignment may be implemented in an on-site direct management system and the employee planning system may be implemented over an employee network.

Although the present invention is a dynamic system that is ultimately designed to be recursive, the operation of the present invention is best understood if one begins with the employer task assignment stage 10. When the multiple aspects of the present invention are described, those of ordinary skill in the art will recognize how the system works on itself to constantly refine and upgrade is predictive abilities.

The present invention works by recognizing that projects may be interpreted as discrete tasks that must be completed during the project. Each task has a start and stop date and each task has an action item associated with it. In other words, $$P = \sum_{n=1}^{x} T_n(X, Y)$$

where P is the project, T is each task, X is a start date and Y is a completion date or time until completion.

In a more complicated embodiment, individual tasks may be linked. Thus, a task whose start date is linked to the stop date of another task may be linked. Tasks may be linked directly, that is a task that cannot be started until another task is completed, or they may be linked indirectly. An indirectly linked task may be related indirectly, such as a task in a different phase of the project, such that its start date is likely to be influenced by the stop date of tasks that in the preceding phase of the project. Linked tasks will be described more in detail in the discussion below concerning risk.

Figure 4:
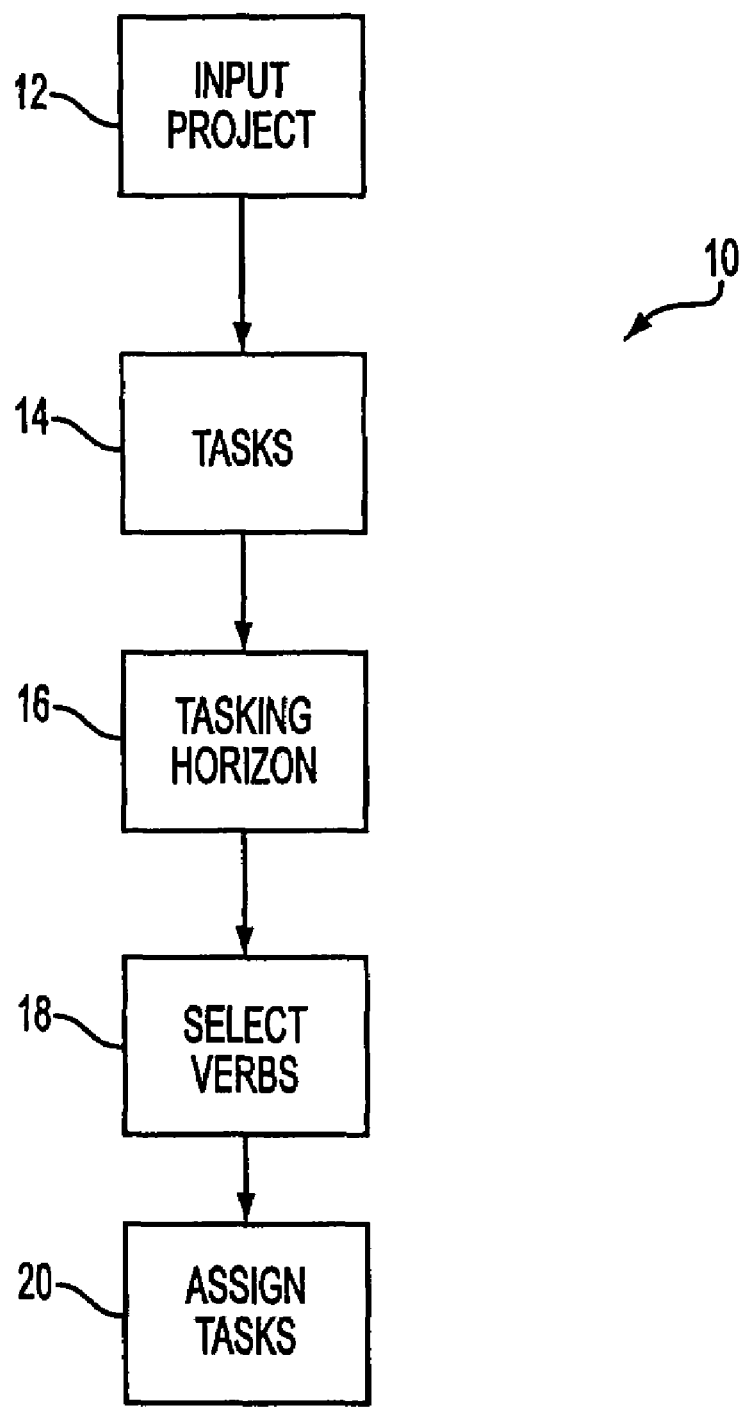
FIG. 4 is a flow chart of the employer task assignment stage.

As shown in FIG. 4, the project is input 12 and the tasks separated out 14. The process of task separation may be automated or may be carried out by an operator. As the recursive nature of the present invention is appreciated, the tasks or types of tasks likely to be in a project may be automatically determined in the task breakdown step 14. The present system can record projects and tasks and provide that information as a default when a new project is initiated.

Once the tasks in a project have been determined, the next aspect of the present invention is the planning of the tasks. The project as a whole will have an ultimate start and stop date. The project start and stop dates are the ultimate time window in which the individual tasks must be completed. The present invention recognizes that the most effective planning is generally limited to a predetermined period of time, which is likely to be much smaller than the project time period. Thus, for task planning purposes the project is broken down into a tasking horizon 16. The tasking horizon is designed to be a realistic window of time over which tasks can be scheduled. In a preferred embodiment, the task horizon is one or two weeks, but it may be a number of days, weeks or even months depending on the tasks being assigned and the group being assigned the tasks.

If the project window is represented by X.sub.t, where t=1 to Z, the tasking window (W) may be represented as a function of X.sub.t to X.sub.t+10, assuming that t is measured in days and there are 5 days in a work week. The tasks can thus be sorted as a function of time (t) and scheduled accordingly.

$$P(X_t) = \sum_{n=1}^{x} W(X_t, X_{t+10}) T_n(X_t, Y)$$

It is important to note that in a multi-tiered implementation of the present invention the tasks may be assigned to groups, which may then assign the tasks to individual employees or groups. Thus, it is expressly contemplated that in some implementations there will be multiple tiers of task assignments. In such multi-tiered implementations it is expressly contemplated that different groups or sub-groups may have different tasking horizons.

It is also expressly contemplated that the start date of a task may depend in whole or in part on the stop date of another task. Thus, the present invention permits tasks to be linked or to be assigned with a risk factor, which will be described in more detail below.

The next step is to assign verbs (V) 18 to each task.

$$P(X_t) = \sum_{n=1}^{x} W(X_t, X_{t+10})T_n(X_t, Y, V_{set})$$

Verbs are designed to capture the types of dialogue that a worker would use to explain why a task was or was not started and/or completed as planned. Verbs may be assigned for all tasks on a project or may change from task to task. By requiring the employee to select a verb, the employee/employer dialogue is standardized so that it is capable of analysis.

In a preferred embodiment it is contemplated that there will be multiple verb sets that the task assignor can simply select. In one embodiment, a verb set is provided that is task independent and includes verbs that are assigned to a task regardless of what that task may be. Other verb sets may be task dependent. A third set of verbs may be provided that are employee specific. Employee specific verbs may be based on an employee's HR data and include verbs that relate to children, medical conditions, etc. Any or all of these verb sets may be used and the present invention is not limited to any one verb set.

Some examples of verbs may include the following groups:

| Task based | Employee based | Employee Specific |
| --- | --- | --- |
| Harder than expected | Health | Children sick |
| Easier than expected | To much work | Family emergency |
| Training needed | To little work | Tired/NBA finals |
| New equipment | Bored | Asthma acting up |

The final step is to assign the tasks 20 that occur during the tasking horizon.

The assignment of tasks can be implemented on a periodic basis or may be assigned at the beginning of the project for automatic assignments during the appropriate tasking horizon. Each day, or at set intervals, the system may check the unassigned tasks and assigns tasks that fall within the next tasking horizon.

It is also expressly contemplated that tasks may be self-assigned. At which point verb sets may be selected from a predetermined verb set or may be subsequently assigned by an employer.

Figure 5:
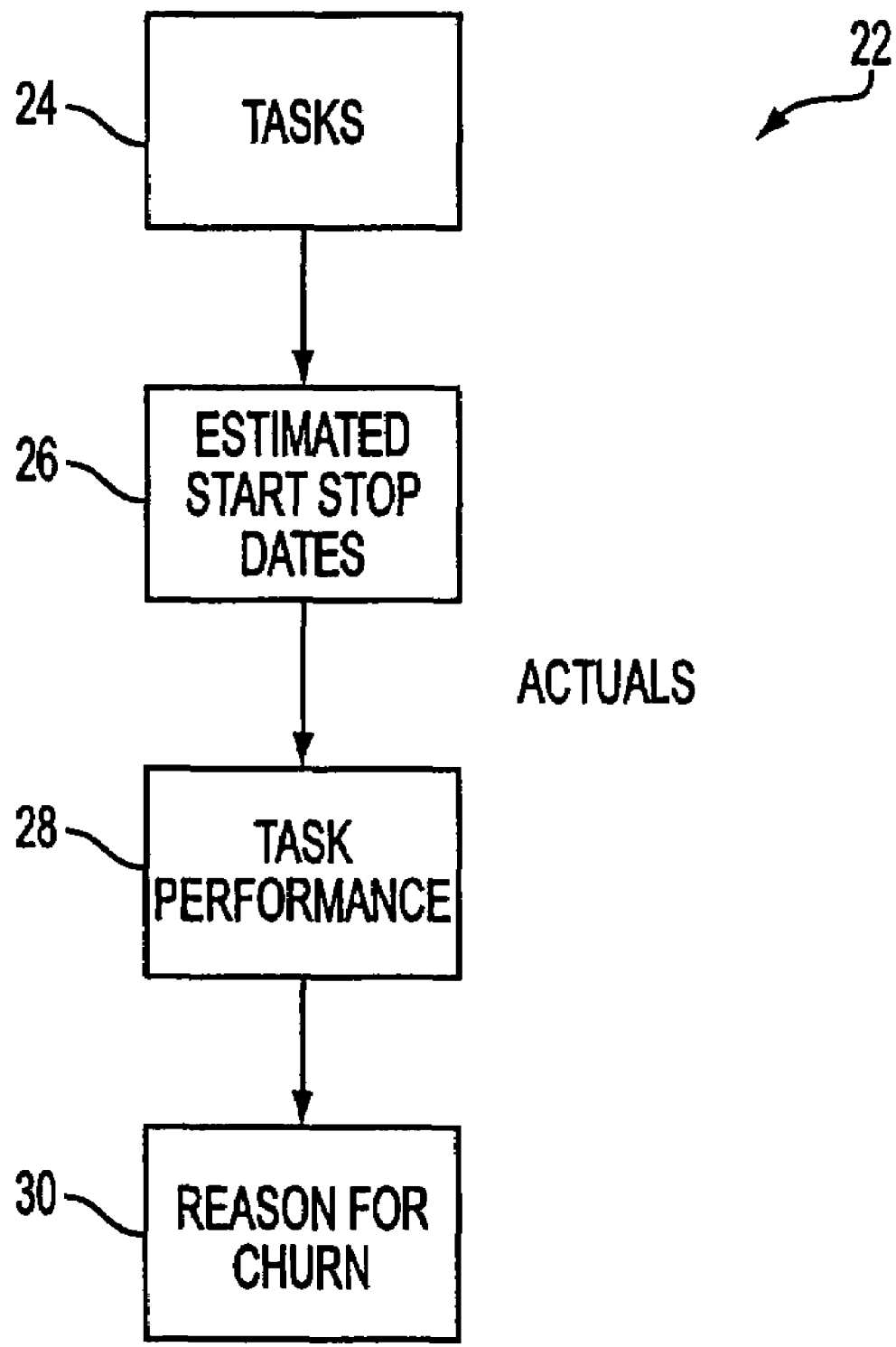
FIG. 5 is a flow chart of the task scheduling stage.

As shown in FIG. 5 after a task has been assigned, the task needs to be scheduled 22. Scheduling is accomplished by having the employee, or in some embodiments the employer, assign start and stop dates 26. Although the present invention is described with respect to start and stop dates, those of ordinary skill in the art will recognize that the invention may be implemented using a start date and a number of working hours or in any other time and work measurement system, such as a start date and cost. The start and stop dates set the standard against which the scheduler's planning abilities are measured. It is also expressly contemplated that a default start and stop date may be provided with the task that the employee may modify.

The next step is for the employee to record the task performance 28. It is preferable that task performance is recorded on a daily basis. In addition to indicating a task is started or completed, the employee is asked to select a verb 30 associated with the action (starting and/or stopping) that best describes why the task was or was not started and/or completed as predicted. The differences between the planned start and stop dates and the actual start and/or stop dates is classified as churn (C).

$$C = T(X_{predicted}, Y_{predicted}) - T(X_{actual}, Y_{actual})$$

The verb is used to classify the reasons for churn, or in other words the reason for why the task was performed as planned or not performed as planned. Churn may be broken down into start churn, completion churn, time churn, cost churn or any other variety. Churn is simply a measure of the relative predictive ability of the employee in relationship to one or more tasks. Churn may be a composite figure or an index of one particular type of ability.

In a preferred embodiment, the churn capturing process is triggered when task dates appear, vanish, and/or move into or out of a current tasking horizon (sometimes). The task edit interfaces (employee side interface) contain data entry fields for estimated start and completion, as well as actual start and completion dates for a particular task. Depending on the case, any and/or all of the aforementioned date values may change during a single transaction. Therefore, a set of rules is necessary to govern date entry, as well as rules to govern which date change or changes should generate churn.

An example of date rules is as follows:

An estimated date cannot be changed if an accompanying actual date exists.

If an actual date is created and the accompanying estimated date does not exist, it is automatically populated with the value of the actual date.

Complete dates may not precede start dates of the same type.

If changes to date fields are valid, then a determination is made whether churn should be generated using churn rules.

Due to the nature of churn and data entry variables involved, churn generation does not have to be limited to a single formula. Rather, churn may be generated based on a series of decisions using information provided by the application user. Churn is captured for all events within a single transaction that meet churn generation requirements.

One example of the general preprocessing of churn is as follows:

If a date changes but does not enter or exit the current tasking horizon, then churn is not generated for the date.

If no start and/or completion date values exist for a task, then new estimated dates are always processed before new actual dates. This is based on the date rule trial estimated dates cannot change while accompanying actual dates exists. In other words, if the actual date is processed first, then processing the change to the estimated date afterwards would violate the date rule.

If an actual date vanishes and its accompanying estimated date appears or is moved into or out of the current tasking horizon, then again, the estimated date is processed after the actual date.

Based on these churn preprocessing rules, an example of churn generation rules is as follows:

If an estimated date is created in or moved into the current tasking horizon, then negative churn is generated.

If an estimated date is deleted or moved out of the current tasking horizon, positive churn is generated.

If an estimated date exists in the current tasking horizon, and an actual date is moved out of, or is created outside of the current tasking horizon, then positive churn is generated.

If an actual date is deleted or is moved out of the current tasking horizon and the accompanying estimated date is not in the current tasking horizon, then positive churn is generated.

If an actual date is created in or is moved into the current tasking horizon and the accompanying estimated date is not in the current tasking horizon, then negative churn is generated.

Churn percentages can thus be calculated as follows:

$$\text{Project Churn Rate} = 100 * DCT/TT$$

$$\text{Negative Churn Rate} = 100 * DCN/TT$$

$$\text{Positive Churn Rate} = 100 * DCP/TT$$

where DCT is equal to the distinct churning tasks in project, DCN is equal to the distinct tasks in project that churned negatively, DCP is equal to the distinct tasks in project that churned positively and TT is equal to the number of tasks in project.

An example of a churn calculation can be understood from the following example. If 100 tasks exist in the current tasking horizon, 5 unplanned tasks are introduced into the current tasking horizon and 10 tasks slip to the next tasking horizon, the positive churn is 10%, the negative churn is 5% and the total churn is 7.5%.

Those of ordinary skill in the art will appreciate that there are many different churn scenarios and that the above example is one of many alternatives.

It is expressly contemplated that an optional employee scheduling monitoring module may be used that keeps track of the time between task scheduling updates. If an employee does not update task performance within periodic periods of time, for example weekly, a reminder to the employee to update his/her tasks can be sent by the module.

Figure 8:
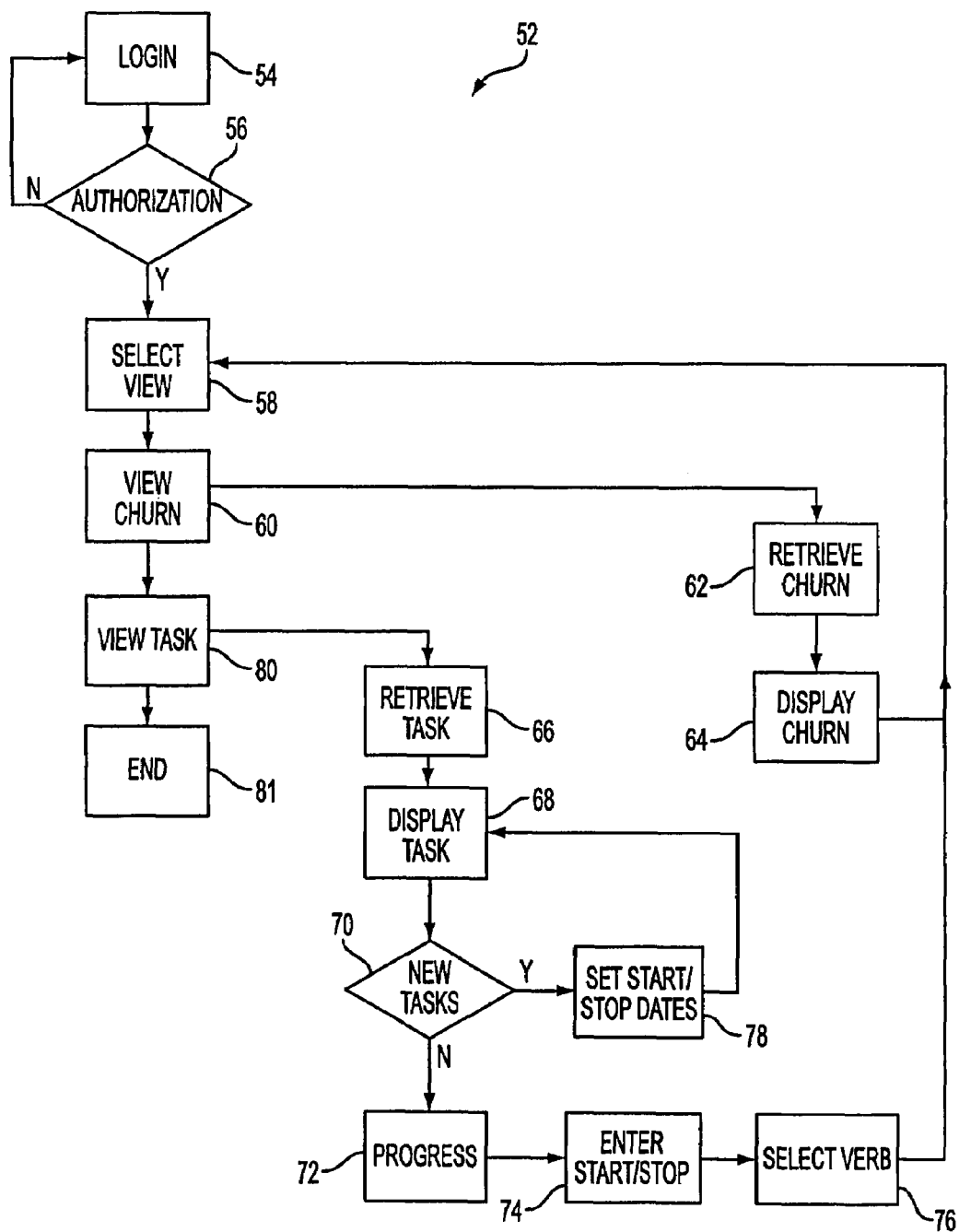
FIG. 8 is a logic diagram of a task assignment stage interface.

One example of a logic diagram for an employee side interface 52 is shown in FIG. 8. This embodiment is designed for use over a network system that is preferably implemented over the Internet and uses a distributed object architecture system, such as CORBA, JAVA or JAVA BEANS. Those of ordinary skill of the art will recognize that the interface may be modified and implemented over a wide variety of systems.

The employee first logs in through a conventional login 54 and authentication 56 routine. After login, the employee may select the views or items to be displayed 58. If the churn rate is requested 60, the most currently available churn data is retrieved 62 and displayed 64. Depending on the type of churn being calculated (task based, employee based and/or environmentally based), multiple churn rates may be displayed. It is expressly contemplated that churn may be displayed numerically, graphically or in any other conventional means.

If the employee chooses to view tasks 80, the system retrieves the tasks assigned to that employee 66 and displays them 68. If the task is new 70, the employee is provided with the ability to set the anticipated start and stop date 78. If the tasks is an existing tasks 74, the employee may update their progress on any of the tasks 74. In addition, for each task trial receives a data input, the employee is requested to enter a verb and/or to select a verb from a predetermined list. The logic diagram is ended at 82.

Determining why tasks are not performed as planned is one of the goals of the present invention. When tasks are not performed as planned they are classified as churn. The verbs that are associated with the reason for the churn can then be analyzed to determine what if anything the employer can do to either minimize the churn or anticipate its occurrence.

Figure 6:
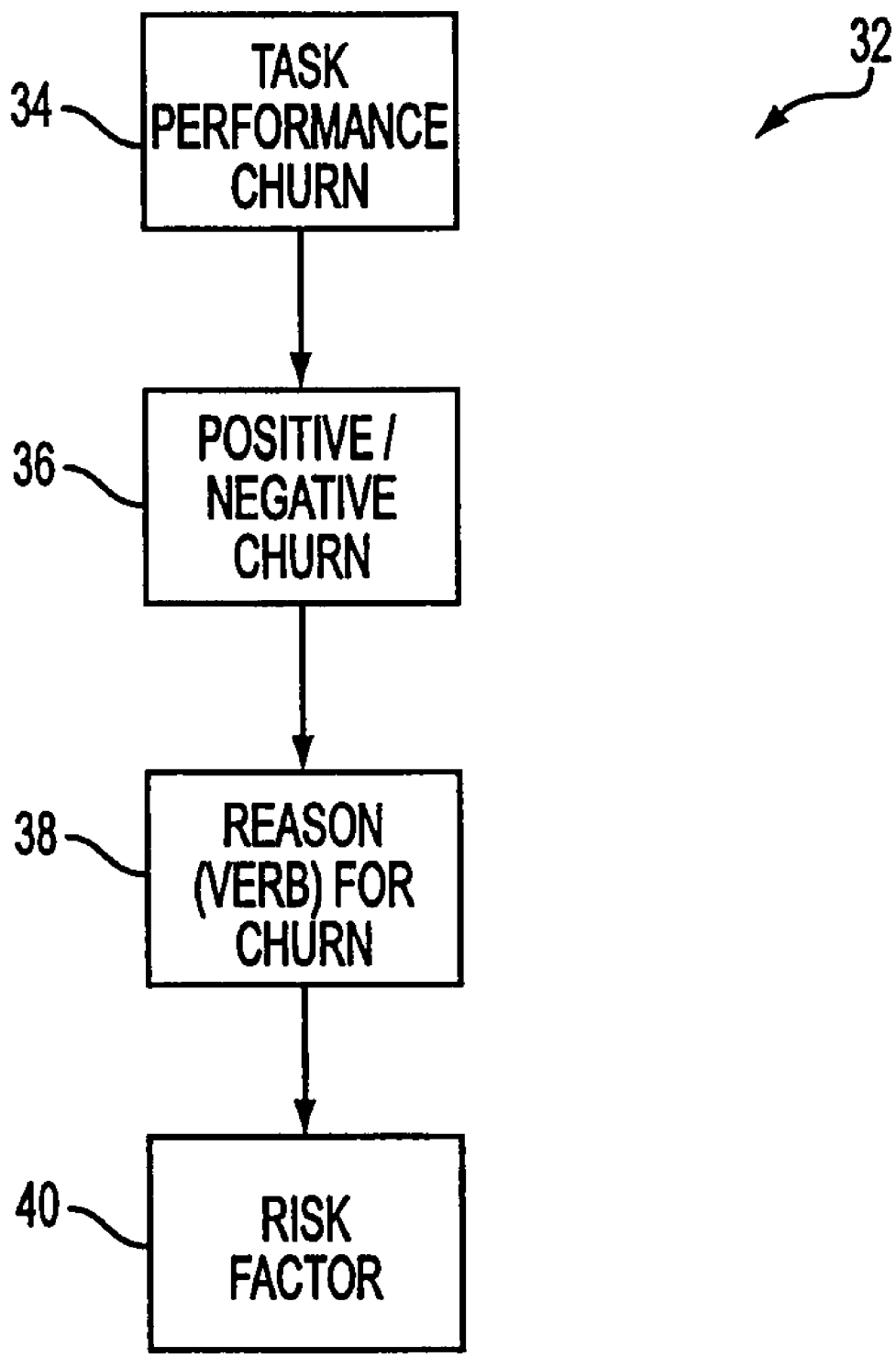
FIG. 6 is a flow chart of a churn management stage.

In one embodiment as shown in FIG. 6, a churn management program 32 is actively connected to the employee task data. Task progress is monitored against the employee's scheduled progress 34. Discrepancies in progress are classified as churn. Churn is calculated 36 and may be either positive or negative. Both positive and negative churn represent a failure of the planning period to accurately predict what actions would occur.

Churn can be analyzed on many different levels. Churn may be calculated by task, by task type, by employee, by groups of employees, etc. Churn is monitored on multiple levels to help identify why the churn occurred. Churn helps identify what an employer can do to reduce churn and also helps the employer recognize what churn it will never be able to reduce. By quantifying churn, the employer may optimize the working environment while at the same time quantifying the intangible variable that force tasks and projects to be completed in a manner other than what was predicted.

When churn is encountered, it is important to know if the reason for the churn and whether it has anything to do with the task itself or the individual who performed the task. The verb associated with the positive churn rate is analyzed to determine what if any effect it should have on an assigned risk factor 40.

Risk factors may be churn dependent or they may be task dependent. Risk factors can be assigned as a function of the predicted length of a project or can be factored as percentage of error or both. For example, an "installing" task may take, on average, 5 working days to complete. An employee that predicts the task can be completed in 4 days will have a risk of 1 day assigned to the task. Alternately, the employee or task can be calculated to take 25% longer than planned. Thus, an employee that schedules the "install" for 4 days may be assigned a 1 day (25%.times.4 days) risk factor.

In addition, a task such as "programming" may not be able to be started until the "installing" task is completed. A risk factor may be assigned to the "programming" start date that is a function of the on-time completion risk associated with the "installing" task. The risk associated with multiple tasks may be quanitified and assigned a weight that reflects the influence of the related task. Thus, for example if there is a 25% chance that the "installing" step may not be completed as planned and the "installing" task has a direct effect on the "programming task, a 100% weight, the risk associated with the "installing" task will be attributed to the "programming task."

The verbs associated with the churn are important is assigning task risk values and in deciding whether there is anything that an employer can do to minimize the churn. For example, if the same worker takes 6 days to do an "install" but identifies a family emergency (personal reason) for the delay, the risk factor assigned to the task may not be modified at all. The reason for the churn is employee based and not task based. The employee's risk factor may also only be effected if the incident rate of family emergencies experienced by the worker exceeds some predetermined norm. Thus, if the employee experiences a 10% greater likelihood of having personal emergencies and on average workers schedules are effected by personal emergencies in 10% of the tasks that are performed, the worker may have a 1% increased risk factor (10% additional risk of a 10% norm) of incurring churn. If the worker's churn is 1 day and the risk factor is 1%, the worker may have a 0.01 day increased risk.

On the other hand, if the same employee identifies training as the reason for the churn, the employer may weigh the cost benefit of training and the possible increase in productivity. Thus, the present system permits tangible and intangible risk to be calculated and norms determined by using verbs that are not attributable to any given personal reason.

Because the present invention mirrors how people actually work, it may use Human Resource (HR) data to assist in predicting likely work patterns. In an alternate embodiment, the churn and risk assessment is made in combination with the employee's human resource data and/or any other data that the employee is willing to share. Events, hobbies, children, family obligations as well as other significant events that can be quantified can be worked into the churn/risk calculation. An employee's risk may fluctuate in relation to trackable events and assigned accordingly. For example, a risk factor may increase or decrease for an employee with children during known vacation periods. When children are home during vacations, depending on the family situation, the employee's risk value may increase or decrease. Thus, if an employee's personal profile indicates that they have children, the children's vacation can automatically be factored into the churn/risk calculations. Likewise, other commitments, whether the employee is on a sport's team or predictable event, such as vacation, can be used to identify churn patterns and optimize risk calculations. The net effect of this type of risk analysis is that the employer can capture the intangible reasons for churn and make realistic decisions about how long tasks will take.

Another important advantage of the system is in identifying employees with below average intangible churn. Employee's who work equally hard regardless of other commitments or events. The employer may use risk management to ensure that employee's do not overwork themselves and take appropriate time off.

Figure 9:
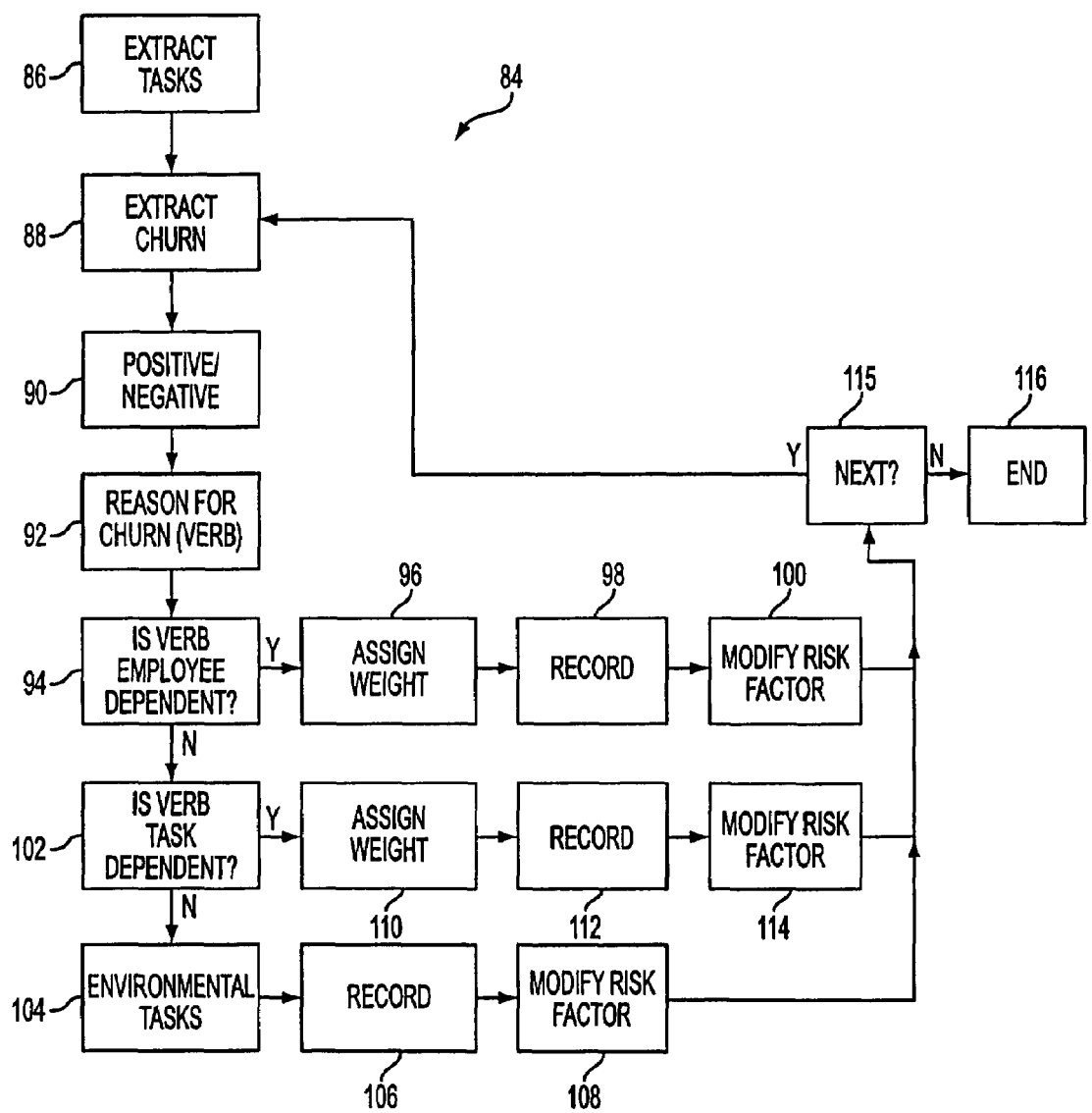
FIG. 9 is a logic diagram of churn monitoring stage.

One example of a churn monitoring program 84 is shown in FIG. 9. This embodiment is designed for use over a network system that is preferably implemented over the Internet and uses a distributed object architecture system, such as CORBA, JAVA or JAVA BEANS. Those of ordinary skill of the art will recognize that the interface may be modified and implemented over a wide variety of systems.

Tasks are first extracted 86 and the associated churn and verbs are determined 88. The churn is classified as positive or negative 90. The verb, reason for the churn, is then analyzed 92. If verb categories are used, the verb can first be compared to the known employee dependent verbs 94. If the verb is employee based, in other words unique to that employee, the verb is compared to an expected norm value and a risk factor is assigned 96. The risk factor is recorded in a database 98 and, if necessary, an overall risk factor is modified 100 for the employee. If the churn is not employee dependent 94, the churn is next analyzed to determine if it is task related 102. If the churn is task related the churn is compared to a norm and assigned a weight and the information is recorded 112. Likewise, the overall risk factor associated with that task may be modified 114. If the churn is not related to the employee or a particular task, it is classified as environmentally related 104. The churn is recorded and the overall environmental risk factor associated with environmental related churn is modified 108. If another task/churn requires analyzing 115, it is sent through the same process until the program ends 116.

Figure 7:
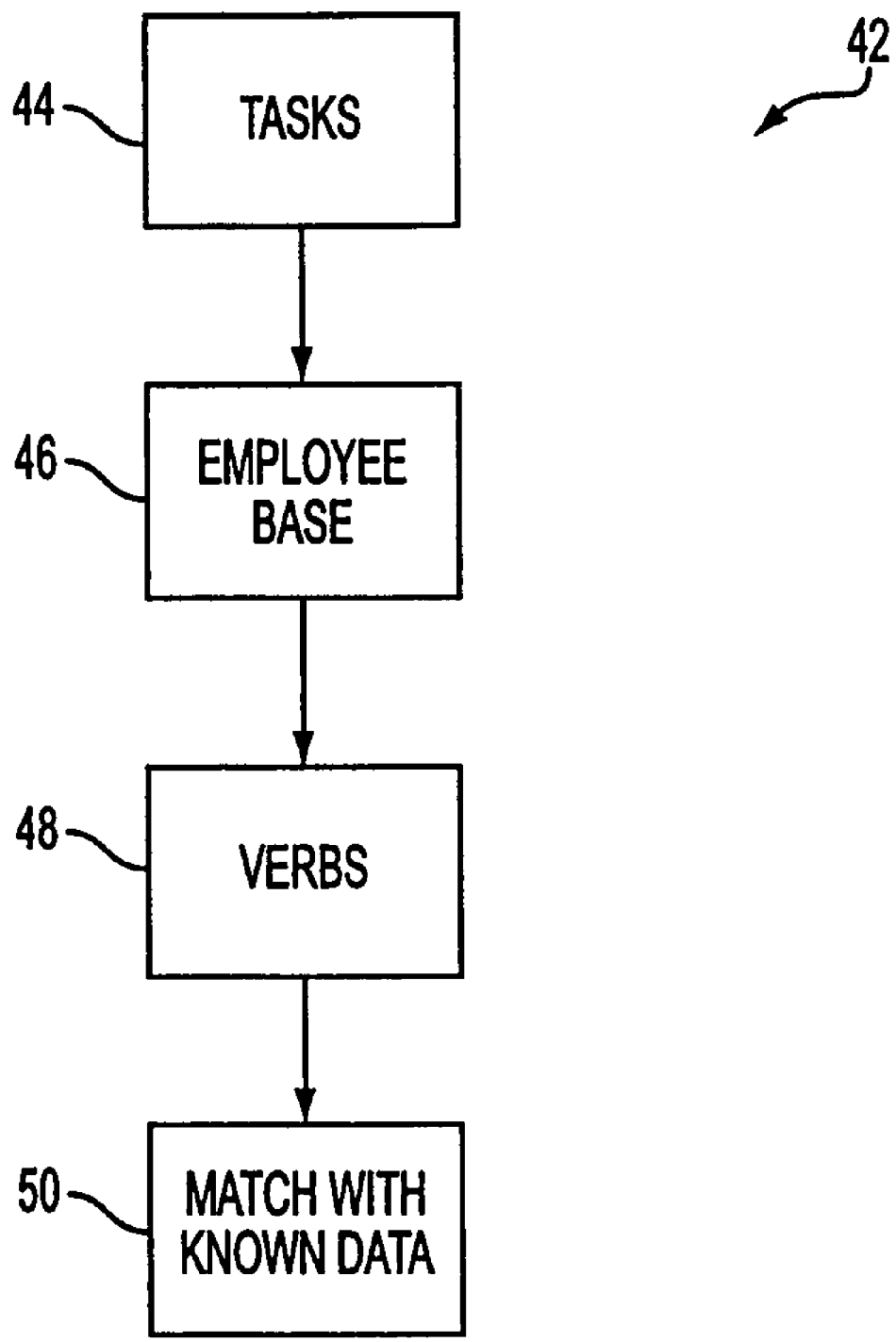
FIG. 7 is a flow chart of a predictive management stage.

One of the main goals of the present system is to assist in the planning stage, before tasks are assigned. Therefor, a predictive management system 42, as shown in FIG. 7, is designed to assist in identifying how long a project, composed of multiple tasks, will take and predict the risk (unexpected time variations) involved with the project.

The predictive management system 42 works by attempting to find as many data points that can be correlated with known data. The first step is to input tasks 44 and any information concerning the employee base 46 trial is available. The verbs that correspond with expected tasks may also be designated 48.

The predictive management system then looks for direct and indirect matches amongst the data and compiles the risk 50. For example, if one or more employees have performed a task that is part of the project, the time period that the task will likely take to perform can be estimated. If direct task matches are not possible, the system can nevertheless use employee based risk and/or environmental risk to estimate the non-task dependent risk that the project is likely to encounter. The system can also compare employee bases and extrapolate predictive information. Graphing of risk factors can also be used to extrapolate risk factor trends that are other-wise not captured by the current system.

Risk may be calculated for a project as a whole, for given time periods or for given tasks. This permits the employer with general predictive information and the ability to identify the most likely place in a project where it will have the greatest likelihood of encountering problems. Staffing decisions and realistic goals can thus be set by management before tasks are assigned to groups or individual employees.

Another example of a predictive management system, which may also be referred to as a profiler, involves the creation of a template for a new project, team, person, etc. based on statistical information that has been gathered in the past.

Figure 10:
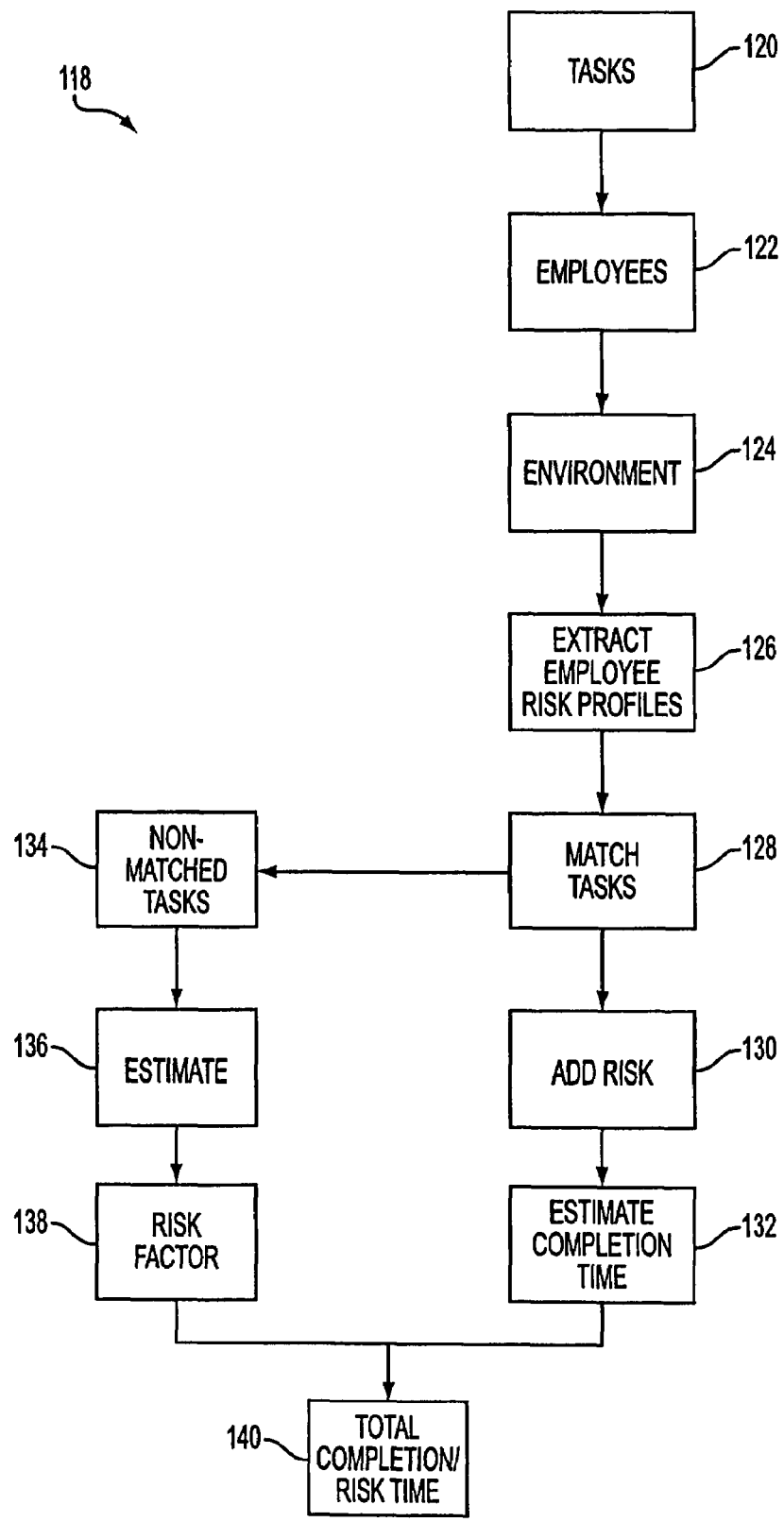
FIG. 10 is a flow diagram of a predictive management system.

One example of a predictive management center 118 is shown in FIG. 10. Tasks are identified 120 along with available employees 122. Each employee's risk profile is extracted 126 from a database. Next, the tasks that will need to be completed are compared against the tasks that the employee's have performed in the past 128. Environmental and employee personal risk is added and an average time for each task is computed together with a composite risk factor 132. Tasks that do not have a direct match 134 are identified and either an estimation is made by the operator how long each task should take to complete 136. Employee and environmental risk factors are added, together with the operator's new task predictive risk factor 138. A total completion time and project risk factor is then generated 140.

The present system may estimate the likely employee planning values using a Fibonacci sequence. For a system size environment the formula is:

$$S = CK^{1/3}T^{4/3}$$

For development efforts the formula is:

$$\frac{0.4(S/C)^3}{T^4}$$

where S is the system size, C is the technology constant, K is the total effort and T is the development time. Those of ordinary skill in the art will recognize that other well known methods of data analysis and pattern recognition, such as Least-Square Estimation, Best Linear Unbiased Estimation, Maximum-Likelihood Estimation, Mean-Square estimation, Maximum A Posteriori Estimation, Wiener Filtering, Kalman Filtering, Iterated Squares, Extended Kalman Filtering, etc., may be used with the present invention.

Those of ordinary skill in the art will appreciate that this is where the system begins to turn on itself and becomes recursive. As predictive ability is captured it can be anticipated and improved.

While the invention has been described, in detail in connection with the preferred embodiments known at the time, it should be readily understood that the invention is not limited to such disclosed embodiments. Rather, the invention can be modified to incorporate any number of variations, alterations, substitutions is or equivalent arrangements not heretofore described, but which are commensurate with the spirit and scope of the invention. Accordingly, the invention is not to be seen as limited by the foregoing description, but is only limited by the scope of the appended claims.

We claim:

1. A computerized method for modeling multiple tasks for multiple users, the computerized method using at least one processor apparatus to carry out the method comprising the steps of:
   breaking a language into component parts, including at least verbs, and objects;
   creating at least one tasking horizon;
   combining the component parts to create at least one language combination, said at least one combination including verbs and objects, which are stored on a computer-readable storage medium along with at least one task;
   said method of modeling further comprising:
      receiving at least one task for the project;
      activating at least one of said tasking horizons, said tasking horizon comprising one of a plurality of time frames over which said at least one task can be completed;
      receiving an actual date for said at least one of said multiple tasks;
      receiving an estimated date for said at least one task;
      using one of the processor apparatuses comprising at least one computer processor to calculate a first negative churn if said received estimated date is created in or moved into said tasking horizon;
      using said processor apparatus to calculate a first positive churn if said received estimated date is deleted or moved out of said tasking horizon;
      using said processor apparatus to calculate a second positive churn if said received estimated date exists in said tasking horizon and said received actual date is moved out of or is created outside of said tasking horizon;
      using said processor apparatus to calculate a third positive churn if said received actual date is moved out of said current tasking horizon and an accompanying received estimated date is not in said current tasking horizon;
      using said processor apparatus to calculate a second negative churn when said received actual date is created in or is moved into said current tasking horizon and said received estimated date is not in said current tasking horizon; and
      receiving language that corresponds to said actual date, wherein the verb describes a reason for said actual date and for said churn;
      wherein said at least one tasking horizon is task independent.

2. The method as claimed in claim 1 further comprising the step of determining the number of tasks for each tasking horizon.

3. The method as claimed in claim 1 further comprising the steps of:
   comparing said tasks of said project to previously performed tasks;
   extracting previously performed task completion data, said data including previous churn data and risk factor data; and
   computing an expected task completion time based at least in part on said previously performed task completion data.

4. The method as claimed in claim 3 wherein said previous risk factor is employee dependent.

5. The method as claimed in claim 3 wherein said previous risk factor is environment dependent.

6. The method as claimed in claim 3 wherein said previous risk factor is language dependent.

7. A method as claimed in claim 3 wherein different employees are matched with at least one of said tasks by a task assignment station based on an employee's risk factor.

8. A method as claimed in claim 3 wherein different task sequencing is proposed by a task assignment station based on language risk factors.

9. A method as claimed in claim 3 wherein different task sequencing is proposed by a task assignment station based on one of said churn values.

10. The method as claimed in claim 1 wherein said verb is classified automatically when one of said at least one tasks is provided based on previous verb classifications.

11. A computer-readable storage medium having a program code embedded thereon for modeling multiple tasks for multiple users comprising:
    a first program code unit for
       breaking a language into component parts, including at least verbs, and objects;
       creating at least one tasking horizon; and
       combining the component parts to create at least one language combination, said at least one combination including verbs and objects which are paired with at least one task; and
    a second program-code unit for
       breaking a project into said at least one task;
       activating at least one of said tasking horizons, said tasking horizon comprising one of a plurality of time frames over which said at least one task can be completed;
       receiving an actual date for said at least one of said multiple tasks;
       receiving an estimated date for said at least one task;
       calculating a first negative churn if said received estimated date is created in or moved into said tasking horizon;
       calculating a first positive churn if said received estimated date is deleted or moved out of said tasking horizon;
       calculating a second positive churn if said received estimated date exists in said tasking horizon and said received actual date is moved out of or is created outside of said tasking horizon;
       calculating a third positive churn is said received actual date is moved out of said current tasking horizon and an accompanying received estimated date is not in said current tasking horizon;
       calculating a second negative churn when said received actual date is created in or is moved into said current tasking horizon and said received estimated date is not in said current tasking horizon; and
       receiving language that corresponds to said actual date, wherein a verb describes a reason for said actual date and for said churn=
       wherein said at least one tasking horizon is task independent.

12. A computer-readable storage medium having a program code embedded thereon for modeling multiple tasks for multiple users comprising:

a first program code unit for breaking a language into component parts, including at least verbs, and objects;

creating at least one tasking horizon; and combining the component parts to create at least one language combination, said at least one combination including verbs and objects which are paired with at least one task; and a second program-code unit for breaking a project into said at least one task;

activating at least one of said tasking horizons, said tasking horizon comprising one of a plurality of time frames over which said at least one task can be completed;

receiving an actual date for said at least one of said multiple tasks;

receiving an estimated date for said at least one task; and analyzing the project schedule based on a temporal relationship between said tasking horizon, said actual date, and said estimated date; and outputting results of the analysis to a display;

wherein said at least one tasking horizon is task independent.

* * * * *